United States Patent
Dong et al.

(10) Patent No.: US 11,476,510 B2
(45) Date of Patent: Oct. 18, 2022

(54) METHODS AND GREEN REAGENTS FOR RECYCLING OF LITHIUM-ION BATTERIES

(71) Applicants: Chang Dong, Markham (CA); Dan Luo, Waterloo (CA)

(72) Inventors: Chang Dong, Markham (CA); Dan Luo, Waterloo (CA)

( * ) Notice: Subject to any disclaimer, the term of this patent is extended or adjusted under 35 U.S.C. 154(b) by 350 days.

(21) Appl. No.: 16/860,104

(22) Filed: Apr. 28, 2020

(65) Prior Publication Data

US 2020/0358148 A1   Nov. 12, 2020

Related U.S. Application Data

(60) Provisional application No. 62/844,721, filed on May 7, 2019.

(51) Int. Cl.

| | |
|---|---|
| H01M 10/54 | (2006.01) |
| H01M 4/525 | (2010.01) |
| H01M 4/505 | (2010.01) |
| H01M 10/0525 | (2010.01) |
| C01G 53/00 | (2006.01) |
| C01B 13/36 | (2006.01) |
| H01M 4/02 | (2006.01) |

(52) U.S. Cl.
CPC ............. H01M 10/54 (2013.01); C01B 13/36 (2013.01); C01G 53/50 (2013.01); H01M 4/505 (2013.01); H01M 4/525 (2013.01); H01M 10/0525 (2013.01); C01P 2006/80 (2013.01); H01M 2004/028 (2013.01); Y02W 30/84 (2015.05)

(58) Field of Classification Search
None
See application file for complete search history.

(56) References Cited

U.S. PATENT DOCUMENTS

| | | |
|---|---|---|
| 9,745,202 B2 | 8/2017 | Song et al. |
| 2013/0206607 A1 | 8/2013 | Kojima et al. |

Primary Examiner — Carlos Barcena
(74) Attorney, Agent, or Firm — Stratford Group Ltd.

(57) ABSTRACT

The present invention states a method of producing new cathode materials for lithium ion batteries by recycling metals from depleted lithium-ion batteries using green reagents, and a method of deriving green reagents from agricultural products. The green reagents are used to replace corrosive acids that are used in the recycling process of depleted lithium-ion batteries. Metal ions, such as nickel, cobalt, manganese, and lithium are recovered as precipitates from the depleted lithium-ion batteries which can further be sintered to produce lithium-containing transition metal oxides that can be used as new cathode material for lithium-ion batteries.

16 Claims, 13 Drawing Sheets

METHODS AND GREEN REAGENTS FOR RECYCLING OF LITHIUM-ION BATTERIES

CROSS-REFERENCE TO RELATED APPLICATIONS

This application claims the benefit of U.S. Provisional Application No. 62/844,721, filed May 7, 2019, the entire content of which is incorporated by reference.

TECHNICAL FIELD

The present disclosure relates to the recycling of lithium-ion batteries. In particular, it relates to a method of making new cathode material from depleted lithium-ion batteries.

BACKGROUND

With the increasing demand for energy and the depletion of petroleum resources, lithium-ion batteries have become a main alternative energy source. However, the life span of lithium-ion batteries is limited. Obsolete lithium-ion batteries generate vast waste and metal pollution, both of which are harmful to the environment. In addition, current disposal methods of using corrosive reagents or pyrometallurgy to recycle metals from depleted lithium-ion batteries has damaging effects on the environment. Furthermore, current recycling methods take time by extracting transition metals individually from depleted lithium-ion batteries as individual precipitates from the batteries.

BRIEF SUMMARY

Disclosed herein is a method to recycle lithium-ion batteries in an environmentally-friendly manner, in which "green" (i.e environmentally-friendly) reagents are used during the recycling process. In addition, there is a provided a method in which transition metals (from the batteries) are collected in the form of transition metal oxides in a precipitate, rather than extracting the various transition metals separately. In addition, the precipitate also can be used to make new cathode material for lithium-ion batteries.

Recovered metals, in this case, are in the form of transition metal compound which are sintered with an external lithium source to form new cathode materials for new lithium-ion cells.

In addition, green reagents are extracted from agriculture products and can be used to replace corrosive acids that are currently used to recycle individual transition metals from waste lithium-ion batteries.

Furthermore, metals that are collected in the form of a transition metal compound with different metals in one precipitate. In addition, the recovered metals can also be used as part of the new cathode material for lithium-ion batteries. This one-step process makes the most of wasted metal ions by realizing its function as new cathode materials.

In one aspect, a method for recycling a depleted lithium-ion battery, the method comprising: retrieving at least one of a cathode and cathode material from the depleted lithium-ion battery; reacting the cathode and/or the cathode material with a first green reagent I at a steady temperature to produce a first mixture; filtering the first mixture to obtain a solution of ions; reacting the solution of ions with a second green reagent to obtain a second mixture; filtering the second mixture to obtain a first precipitate and a filtrate; precipitating the filtrate with a precipitating agent within a pH range to produce a suspension; filtering the suspension to obtain a second precipitate; combining the first precipitate and the second precipitate to provide a combination; and treating the combination of the first precipitate and the second precipitate to produce new cathode material.

In some embodiments, the second mixture is evaporated to produce a turbid liquid, which is subsequently filtered.

In some embodiments of the method, the first green reagent is extracted from one or more agricultural products selected from the group consisting of lemon, lime, orange, pineapple, grapefruit, blackberry, raspberry, cranberry, tamarind, grape, apple, pear and any mixture thereof.

In some embodiments of the method, the first green reagent comprises: a first organic acid at about 0.5% to about 80% by weight of the first reagent weight; a reducing organic matter at about 0.1% to 60% by weight of the first reagent weight; and a solvent at about 20% to about 99.9% by weight of the first reagent weight. The first organic acid may be selected from the group consisting of citric acid, tartaric acid, maleic acid, oxalic acid, L-ascorbic acid, succinic acid, quinic acid, isocitric acid and any mixture thereof. The reducing organic matter may be selected from the group consisting of L-ascorbic acid, glucose, fructose and any mixture thereof. The solvent may be selected from the group consisting of water, an alcohol and any mixture thereof. The alcohol may be a $C_1$-$C_8$ aliphatic alcohol. In some embodiments, the alcohol is methanol or ethanol.

In some embodiments of the method, the second green reagent is extracted from one or more agricultural products selected from the group consisting of spinach, cocoa, beans, lettuce, kale, bamboo, celery, beet, amaranth, apple, leeks, coffee bean, hawthorn, grapes, plant leaves, tea leaf, purslane, bitter herbs, bamboo shoots, bitter gourd and any mixture thereof.

In some embodiments of the method, the second green reagent comprises: a second organic acid at about 0.1% to about 60% by weight of the second reagent weight; and a solvent at about 40% to about 99.9% by weight of the second reagent weight. The second organic acid may be selected from the group consisting of oxalic acid, tannic acid, caffeic acid and any mixture thereof. The solvent may be selected from the group consisting of water, an alcohol and any mixture thereof. The alcohol may be a $C_1$-$C_8$ aliphatic alcohol. In some embodiments, the alcohol is methanol or ethanol.

In some embodiments of the method, steady temperature is between about 30° C. and about 90° C. The steady temperature may be about 70° C.

In some embodiments of the method, the pH range is from about 1 to about 12. The pH range may be from about 7 to about 12.

In some embodiments of the method, the precipitating agent is selected from sodium chloride (NaCl), sodium bisulfate ($NaHSO_4$), monosodium phosphate ($NaH_2PO_4$), sodium hydroxide (NaOH), sodium carbonate ($Na_2CO_3$), sodium bicarbonate ($NaHCO_3$), trisodium phosphate ($Na_3PO_4$), sodium sulfite ($Na_2SO_3$), disodium phosphate ($Na_2HPO_4$) and any mixture thereof.

In some embodiments of the method, the first precipitate is a transition metal compound comprising at least one of a nickel ion, a cobalt ion and a manganese ion. In some embodiments, the second precipitate comprises a lithium salt. In some embodiments, treating the combination comprises proportional feeding, grinding and sintering. In some embodiments, the new cathode material comprises Li, Co, Ni, Mn and any mixture thereof, recycled from the depleted lithium-ion battery.

In another aspect, a first green reagent for recycling a depleted lithium-ion battery, the reagent comprising: a first organic acid at about 0.5% to about 80% by weight of the first reagent weight; a reducing organic matter at about 0.1% to 60% by weight of the first reagent weight; and a solvent at about 20% to about 99.9% by weight of the first reagent weight. The first organic acid may be selected from the group consisting of citric acid, tartaric acid, maleic acid, oxalic acid, L-ascorbic acid, succinic acid, quinic acid, isocitric acid and any mixture thereof. The reducing organic matter may be selected from the group consisting of L-ascorbic acid, glucose, fructose and any mixture thereof. The solvent may be selected from the group consisting of water, an alcohol and any mixture thereof. The alcohol may be a $C_1$-$C_8$ aliphatic alcohol. In some embodiments, the alcohol is methanol or ethanol.

In some embodiments of the first green reagent, the first green reagent is extracted from one or more agricultural products selected from the group consisting of lemon, lime, orange, pineapple, grapefruit, blackberry, raspberry, cranberry, tamarind, grape, apple, pear and any mixture thereof.

In another aspect, a second green reagent for recycling a depleted lithium-ion battery, the reagent comprising: a second organic acid at about 0.1% to about 60% by weight of the second reagent weight; and a solvent at about 40% to about 99.9% by weight of the second reagent weight. The second organic acid may be selected from the group consisting of oxalic acid, tannic acid, caffeic acid and any mixture thereof. The solvent may be selected from the group consisting of water, an alcohol and any mixture thereof. The alcohol may be a $C_1$-$C_8$ aliphatic alcohol. In some embodiments, the alcohol is methanol or ethanol.

In some embodiments of the second green reagent, the second green reagent is extracted from one or more agricultural products selected from the group consisting of spinach, cocoa, beans, lettuce, kale, bamboo, celery, beet, amaranth, apple, leeks, coffee bean, hawthorn, grapes, plant leaves, tea leaf, purslane, bitter herbs, bamboo shoots, bitter gourd and any mixture thereof.

BRIEF DESCRIPTION OF THE SEVERAL VIEWS OF THE DRAWINGS

The details of one or more embodiments of the subject matter of this specification are set forth in the accompanying drawings and the description below. Other features, aspects, and advantages of the subject matter will become apparent from the description, the drawings, and the claims.

To easily identify the discussion of any particular element or act, the most significant digit or digits in a reference number refer to the figure number in which that element is first introduced.

The term "green reagent" as used herein is generally known in the art as a reagent that is environmentally friendly. In some embodiments, a green reagent is derived from the processing of agricultural crops. In some embodiments, agricultural crops can be crops, livestock and livestock products, including but not limited to field crops, fruits, vegetables, horticultural specialties, milk, eggs and any mixture thereof. In some embodiment, agricultural products can be waste agricultural products or agricultural bi-products.

A lithium-ion battery or Li-ion battery is a type of rechargeable battery in which lithium is the main component of the battery cell. It is commonly used for portable electronics and electric vehicles. In these batteries, there are cathodes and anodes built on site. Lithium ions move from the cathode through an electrolyte to the anode during discharge, and back when charging. Li-ion batteries use an intercalated lithium compound as the material at the cathode and typically graphite or silicon/carbon at the anode. The composition of the cathode varies based on chemistry, performance, cost and safety considerations. Lithium is typically compounded with several other metal oxides, such as oxides of nickel, cobalt and manganese, to realize the function of the battery.

A "transition metal compound" hereinto refers to a compound that comprises transition metal ions.

"Sintering" refers to the process of compacting and forming a solid mass of material by heat or pressure without melting the material to the point of liquefaction. Sintering can occur as part of a manufacturing process used with metals, ceramics, plastics or other materials.

Figure 1:
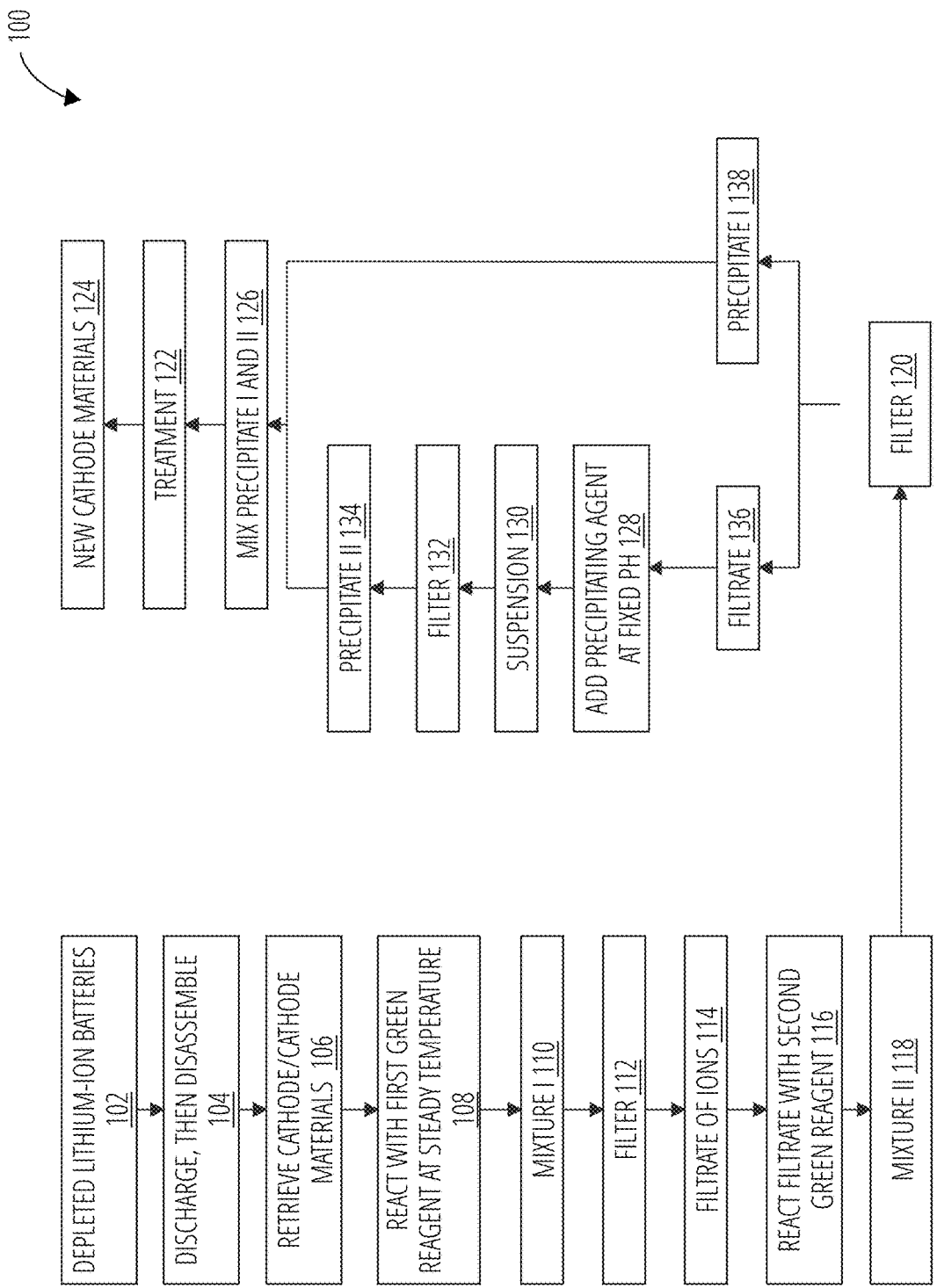
FIG. 1 illustrates a process of using green reagents to prepare new cathode material from depleted lithium ion batteries in accordance with one embodiment.

FIG. 1 illustrates a process 100 of using green reagents to prepare new cathode material from depleted lithium ion batteries in accordance with one embodiment.

At step 102, depleted lithium-ion batteries are collected.

At step 104, depleted lithium-ion batteries are disassembled and discharged using methods known in the art, to obtain cathode and/or cathode materials at step 106.

At step 108, the cathode and/or cathode materials are reacted with a first green reagent at a steady temperature for a period of time. In some embodiments, the steady temperature is between about 30° C. and about 90° C.; or at about 70° C. In some embodiments, the reacting period of time may be between about 1 to 12 hours; or between 1.5 hours to 5 hours. Step 108 also includes leaching processing, after which Mixture I is obtained at step 110.

At step 112, Mixture I is filtered to separate insoluble parts, and to obtain a filtrate at step 114, which comprises a solution of metal ions such nickel, cobalt, manganese, lithium ions and any mixture thereof.

At step 116, the filtrate (comprising a solution of ions solutions) reacts with a second green reagent to precipitate metals from the solution, resulting in Mixture II at step 118.

At step 120, Mixture II is filtered to produce Precipitate I 138 and filtrate 136. Precipitate I 138 comprises transition metal compounds that comprise metals such as nickel, cobalt, manganese ions and any mixture thereof.

At step 128, a precipitating agent is added to filtrate 136 at a fixed pH within a pH range to obtain a suspension 130. In some embodiments, the pH of precipitation process is within the range of 1 to 12. In some embodiments, the pH of the precipitation process at step 128 is within the range 7 to 12.

At step 128, the precipitating agent can be selected from sodium chloride (NaCl), sodium bisulfate ($NaHSO_4$), monosodium phosphate ($NaH_2PO_4$), sodium hydroxide (NaOH), sodium carbonate ($Na_2CO_3$), sodium bicarbonate ($NaHCO_3$), trisodium phosphate ($Na_3PO_4$), sodium sulfite ($Na_2SO_3$), disodium phosphate ($Na_2HPO_4$) and any mixture thereof.

At step 132, the suspension 130 is filtered to obtain Precipitate II 134. In some embodiments, Precipitate II comprises lithium ions.

At step 126, Precipitate I 138 and Precipitate II 134 are mixed. As an example, the precipitates can be ball-milled for 1 hour to 48 hours.

The mixture is subsequently treated at step 122 using methods known in the art of proportional feeding, grinding and sintering to produce new cathode materials 124 for lithium-ion cells. As an example, the mixture of Precipitate I 138 and precipitate II 134 can undergo a heat treatment step, in which the materials are pre-calcined between 400 degree to 600 degrees for 3 hours to 12 hours. Then the resulting material is collected and pressed tightly for calcination between 600 degrees to 900 degrees for 6 hours to 24 hours. The calcination is performed under air atmosphere.

Figure 2:
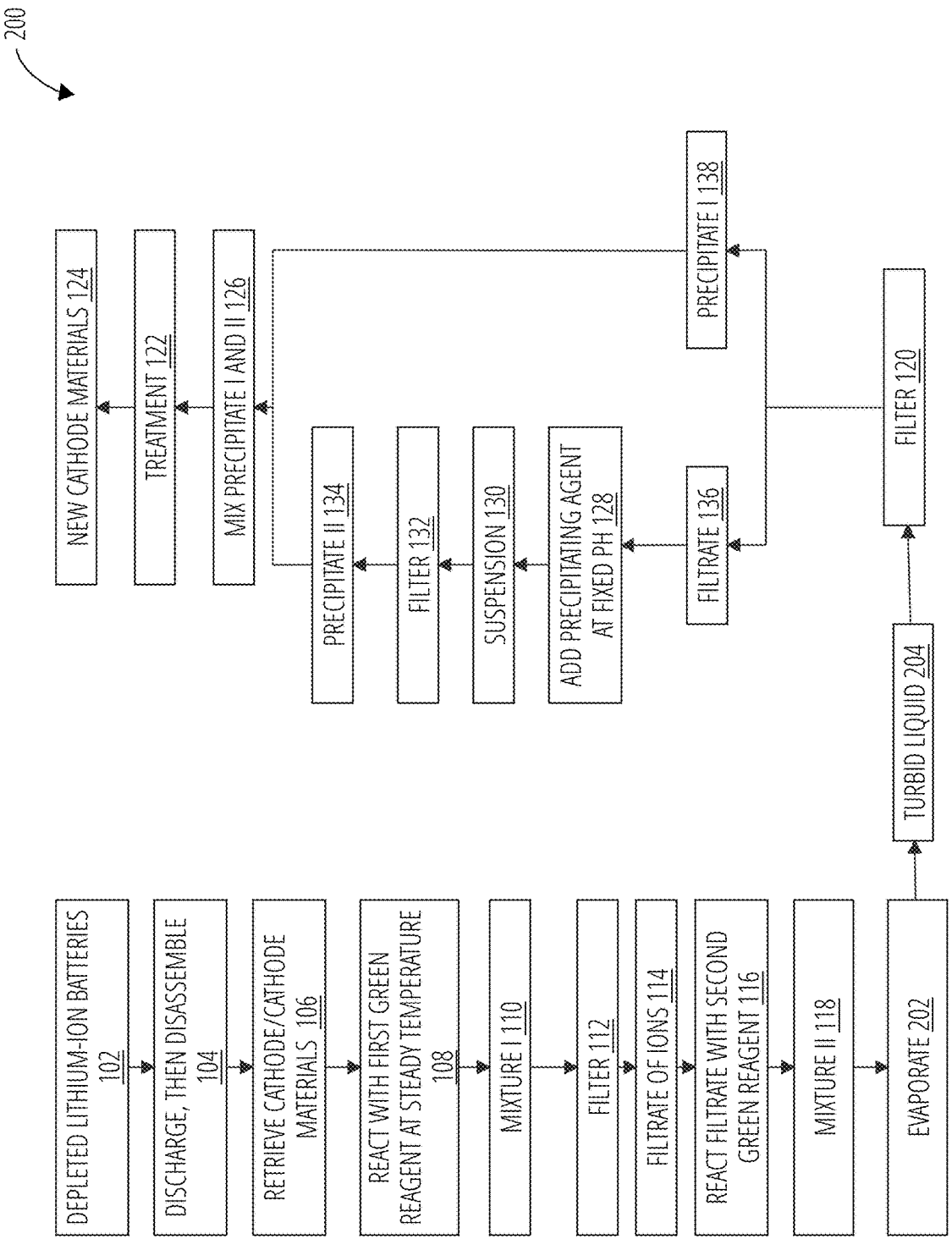
FIG. 2 illustrates a process of using green reagents to prepare new cathode material from depleted lithium ion batteries in accordance with one embodiment.

FIG. 2 illustrates a process 200 of using green reagents to prepare new cathode material from depleted lithium ion batteries in accordance with one embodiment. Process 200 differs from process 100 shown in FIG. 1, prior to step 120. After Mixture II is obtained at step 118, it can be evaporated at step 202 (to reduce liquid) and produce a turbid liquid 204 which is then filtered at step 120. The remaining steps are the same as in FIG. 1.

First Green Reagent

A first green reagent used for lithium-ion battery recycling, can comprise: a first organic acid at about 0.5% to about 80% by weight of the total composition; a reducing organic matter at about 0.1% to 60% by weight of the total composition; and a solvent at about 20% to about 99.9% by weight of the total composition.

The first green reagent can be extracted from one or more agricultural products. Non-limiting examples of one or more agricultural products include lemon, lime, orange, pineapple, grapefruit, blackberry, raspberry, cranberry, tamarind, grape, apple, pear and any mixture thereof. In addition, the first green reagent can function as leaching agent.

The first green reagent comprises reducing organic matter. Non-limiting examples of reducing organic matter include L-ascorbic acid, glucose, fructose and any mixture thereof. The reducing organic matter may function as a leaching agent.

The first green reagent comprises a first organic acid, which can be selected from the group consisting of citric acid, tartaric acid, maleic acid, oxalic acid, L-ascorbic acid, succinic acid, quinic acid, isocitric acid and any mixture thereof. The first organic acid can function as a leaching agent and/or as a precipitating agent.

The first green reagent comprises a solvent. In some embodiment, the solvent is water, an alcohol, or a combination of water and an alcohol. In some embodiments, the alcohol is a $C_1$-$C_8$ aliphatic alcohol. In some embodiments, the alcohol is a $C_1$-$C_3$ aliphatic alcohol. In some embodiments, the alcohol is methanol or ethanol.

The first organic acid and the reducing organic matter, can each function as a leaching agent. A leaching agent can be used to dissolve metal oxides of cathode materials from depleted lithium-ion batteries, and to obtain metal ionic solutions that contains nickel, cobalt, manganese, lithium ions and any mixture thereof.

The first organic acid can function as a precipitating agent. A precipitating agent is used to precipitate metals from a metal ionic solution to produce metal precipitates that contain nickel ions, cobalt ions, manganese ions and any mixture thereof.

Figure 3:
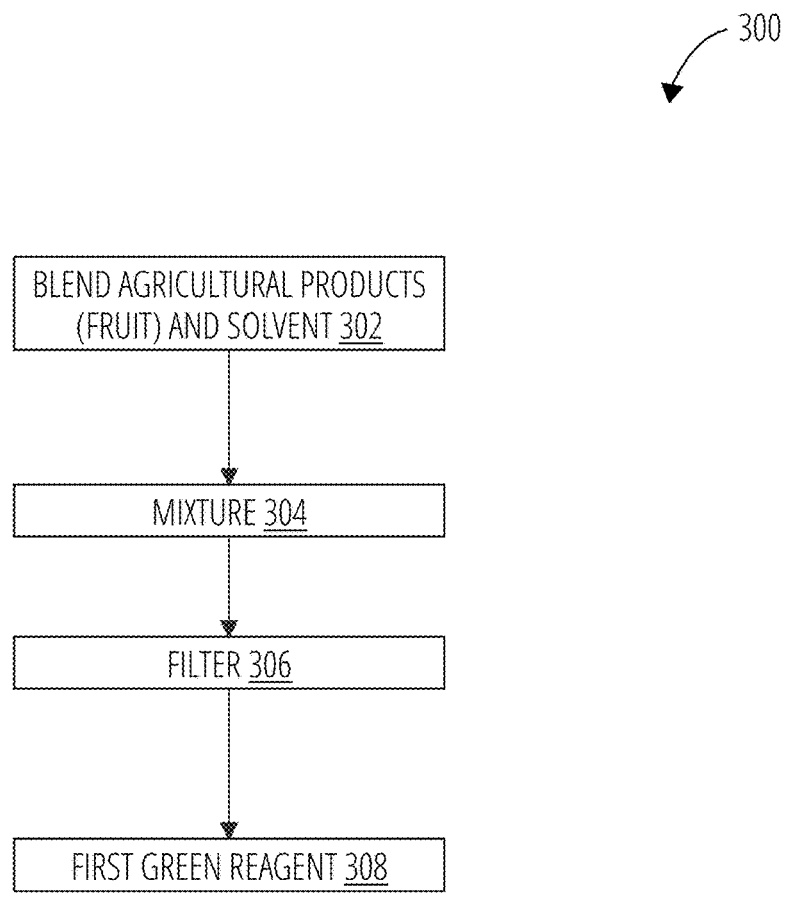
FIG. 3 illustrates a process of preparing a first green reagent in accordance with one embodiment.

FIG. 3 illustrates a process 300 of preparing a first green reagent in accordance with one embodiment.

At step 302, agricultural products and a solvent are mixed together to obtain mixture 304. As discussed above, the agricultural products comprise fruit. At step 302, the items are blended to homogeneity using methods known in the art. For example, blending at step 302 can take place at high speed, to obtain mixture 304. At step 306, mixture 304 is filtered to separate insoluble substances from a solution to obtain a first green reagent 308 in the form of a solution.

Figure 4:
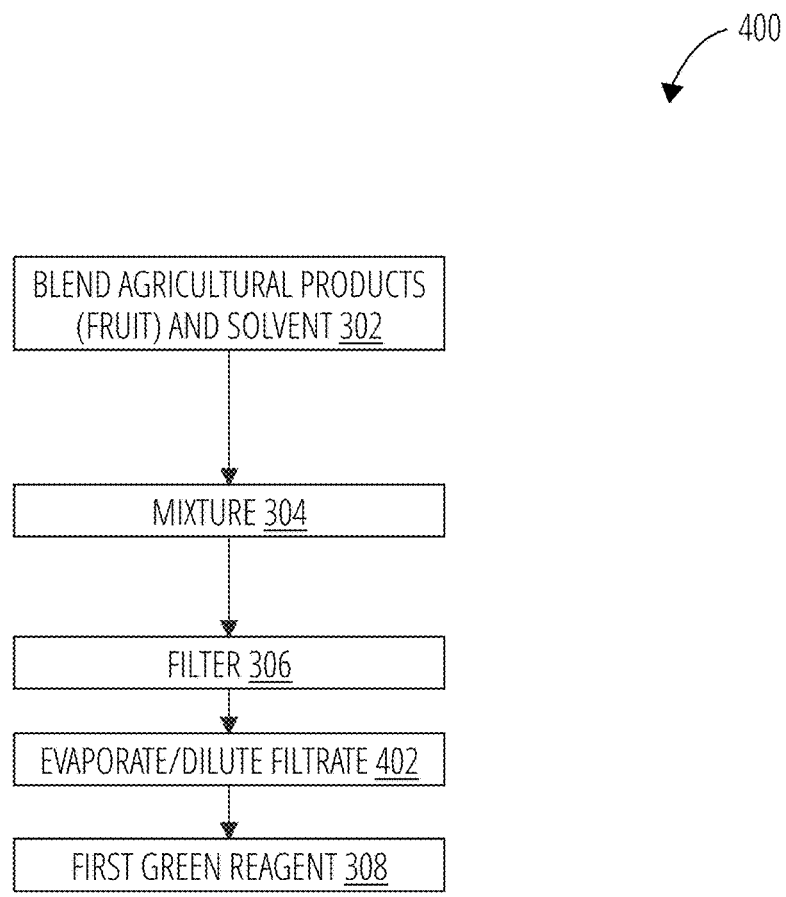
FIG. 4 illustrates a process of preparing a first green reagent in accordance with one embodiment.

Process 300 can be modified by either evaporating or diluting the filtrate, in order to provide the required form of the first green reagent 308. This is shown in process 400 of FIG. 4, in which an added step 402 of evaporation/dilution is added in order to prepare the first green reagent.

Second Green Reagent

A second green reagent used for lithium-ion battery recycling, can comprise: a second organic acid at about 0.1% to about 60% by weight of the total composition; and a solvent at about 40% to about 99.9% by weight of the total composition.

In some embodiments, the green reagent II composition can be extracted from agricultural products consisting of such as spinach, cocoa, beans, lettuce, kale, bamboo, celery, beet, amaranth, apple, leeks, coffee bean, plant leaves, hawthorn, grape, tea leaf, purslane, bitter herbs, bamboo shoots, bitter gourd and any mixture thereof.

The second green reagent can be extracted from one or more agricultural products. Non-limiting examples of one or more agricultural products include spinach, cocoa, beans, lettuce, kale, bamboo, celery, beet, amaranth, apple, leeks, coffee bean, hawthorn, grapes, plant leaves, tea leaf, purslane, bitter herbs, bamboo shoots, bitter gourd and any mixture thereof.

The second green reagent comprises a second organic acid, which can be selected from the group consisting of oxalic acid, tannic acid, caffeic acid and any mixture thereof.

The second green reagent comprises a solvent. In some embodiment, the solvent is water, an alcohol, or a combination of water and an alcohol. In some embodiments, the alcohol is a $C_1$-$C_8$ aliphatic alcohol. In some embodiments, the alcohol is a $C_1$-$C_3$ aliphatic alcohol. In some embodiments, the alcohol is methanol or ethanol.

The second green reagent can function as a precipitating agent. A precipitating agent is used to precipitate metals from a metal ionic solution to produce metal precipitates that contain nickel ions, cobalt ions, manganese ions and any mixture thereof.

The second green reagent can also function as a leaching agent. In some embodiments, oxalic acid serves as a leaching agent.

Figure 5:
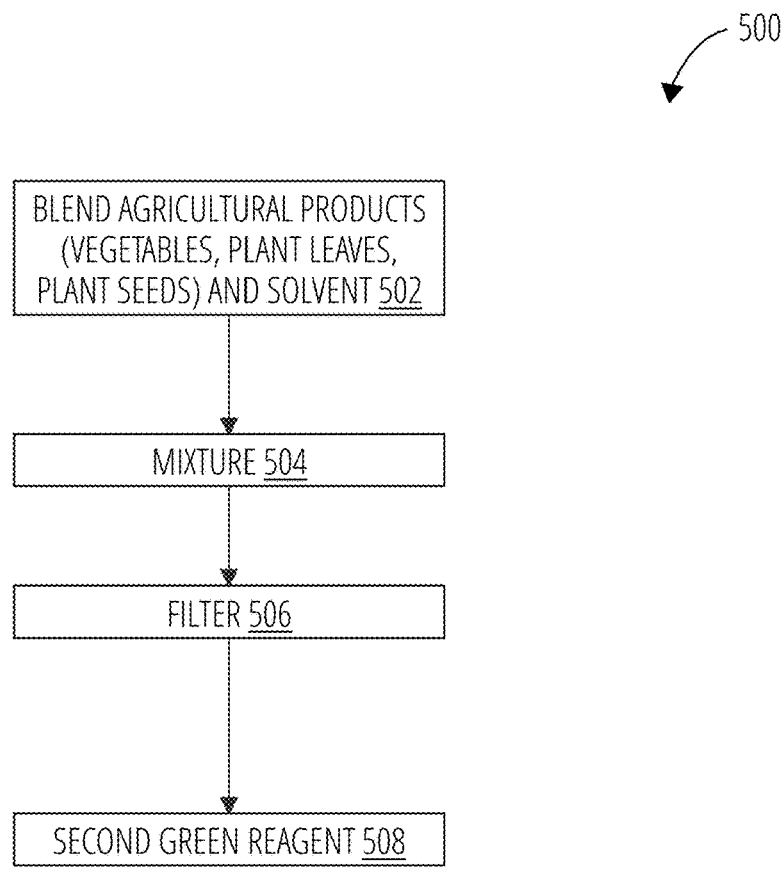
FIG. 5 illustrates a process of preparing a second green reagent in accordance with one embodiment.

FIG. 5 illustrates a process 500 of preparing a second green reagent in accordance with one embodiment.

At step 502, agricultural products and a solvent are mixed together to obtain mixture 504. As discussed above, the agricultural products can comprise vegetables, plant leaves, plant seeds and any mixture thereof. At step 502, the items are blended to homogeneity using methods known in the art. For example, blending at step 502 can take place at high speed, to obtain mixture 504. At step 506, mixture 504 is filtered to separate insoluble substances from a solution to obtain a second green reagent 508 in the form of a solution.

Figure 6:
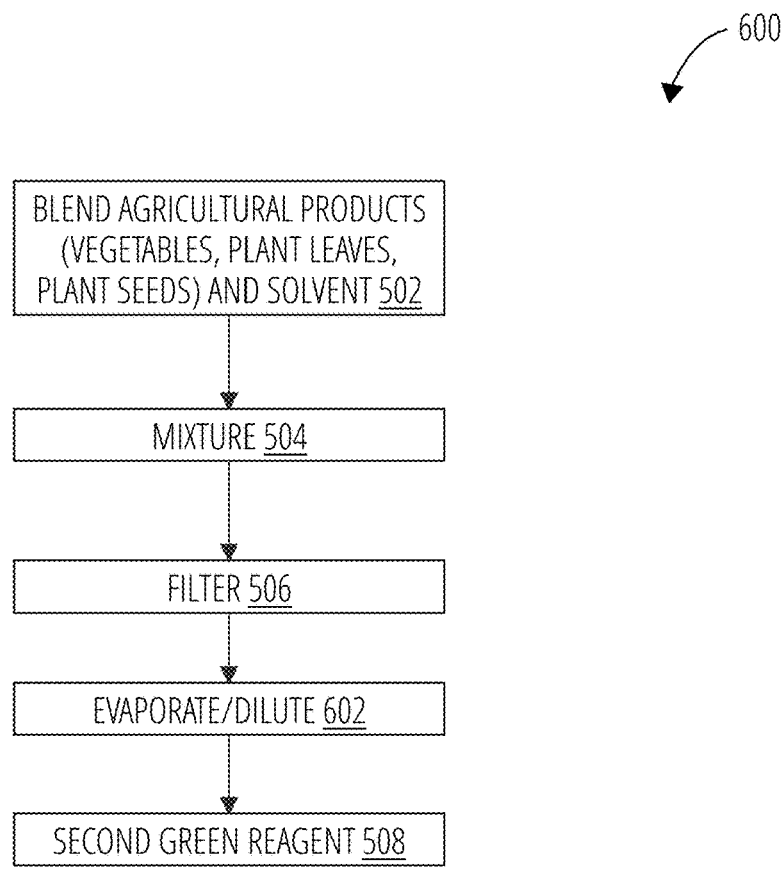
FIG. 6 illustrates a process of preparing a second green reagent in accordance with one embodiment.

Process 500 can be modified by either evaporating or diluting the filtrate, in order to provide the required form of the second green reagent 508. This is shown in process 600 of FIG. 6, in which an added step 602 of evaporation/dilution is added in order to prepare the first green reagent.

Precipitating Agent

A precipitating agent is used to precipitate metals from a metal ionic solution to produce metal precipitates that contain nickel ions, cobalt ions, manganese ions and any mixture thereof.

In some embodiments, the first organic acid (of the first green reagent) is used as a precipitating agent. The first organic acid can be selected from the group consisting of citric acid, tartaric acid, maleic acid, oxalic acid, L-ascorbic acid, succinic acid, quinic acid, isocitric acid and any mixture thereof.

In some embodiments, the second green reagent is used as a precipitating agent. The second green reagent comprises a second organic acid, which can be oxalic acid that is used as a precipitating agent.

In some embodiments, the precipitating agent can be selected from sodium hydroxide (NaOH), sodium carbonate ($Na_2CO_3$), sodium bicarbonate ($NaHCO_3$), trisodium phosphate ($Na_3PO_4$), sodium sulfite ($Na_2SO_3$) and disodium phosphate ($Na_2HPO_4$), each of which can be used to precipitate lithium salt from the metal ionic solutions.

EXAMPLES

Example 1

600 g of lime fruit and 50 g water were collected, blended and filtered rated to produce a first green reagent. 1300 g of spinach and 200 g water were collected, blended and filtered to produce a second green reagent.

The depleted battery was a Panasonic™ 18650B lithium-ion battery having $LiNi_{0.8}Co_{0.01}Mn_{0.1}O_2$ as an active material of the cathode. 5 g of the cathode was collected, cut, mixed, and reacted with 100 ml of the first green reagent to give Mixture I which was heated in a water bath at 70-80° C. for 2 hours and then was filtered to produce a metal ion solution.

300 g of the second green was added to the metal ion solution to produce Mixture II, which was further evaporated and filtered to collect Precipitate I and the remaining filtrate. Precipitate I was in a form of $Ni_{0.83}Co_{0.1}Mn_{0.07}C_2O_4 \cdot 2H_2O$ and the recovering efficiencies of Ni, Co, Mn transition metals were 95.7%, 96.7% and 93.8%, respectively.

$Na_2CO_3$ was added as a precipitating agent to the remaining filtrate while continuously stirring until the solution pH attained a value of 9. The resulting suspension was filtered to produce Precipitate II. Chemical analysis revealed that Precipitate II was in the form of $Li_2CO_3$ and the recovering efficiency of lithium was above 95%.

5 g of Precipitate I and 2.78 g Precipitate II were dried in an oven at a temperature of 70° C. and well mixed. Additional 0.1 g $MnCO_3$ was fed into the mixture for mortar grinding for about 1 hour. After this, the materials were ball milled for 48 hours, pre-calcined under 450° C. for 6 hours and calcined under 900° C. for 12 hours to produce $LiNi_{0.8}Co_{0.01}Mn_{0.1}O_2$ in the form of a black powder for later use as a cathode material for Li-ion battery fabrication.

Example 2

600 g of orange fruit and 50 g water were collected, blended and filtered to produce a first green reagent. 1300 g of spinach and 200 g water were collected, blended and filtered to produce a second green reagent.

The depleted battery was a Panasonic™ 18650B lithium-ion battery having an active cathode material of $LiNi_{0.8}Co_{0.1}Mn_{0.1}O_2$. 5 g of the cathode was collected, cut, mixed, and reacted with 100 ml of the first green reagent to provide Mixture I, which was then heated in a water bath at 70-80° C. for 2 hours and then filtered to produce a metal ion solution.

300 g of the second green reagent was added to the metal ion solution to produce Mixture II, which was further evaporated and filtered to collect Precipitate I and the remaining filtrate. Precipitate I was in a form of $Ni_{0.83}Co_{0.1}Mn_{0.07}C_2O_4 \cdot 2H_2O$ and the recovering efficiencies of Ni, Co and Mn transition metals were 92.5%, 92.8% and 89.5%, respectively.

$Na_2CO_3$ as a precipitating agent was added into the remaining filtrate while continuously stirring until a pH of 9 was attained. The resulting suspension was filtered to provide Precipitate II. Chemical analysis revealed that Precipitate II was in the form of $Li_2CO_3$ and the recovering efficiency of lithium was above 95%.

5 g of Precipitate I and 2.78 g of Precipitate II were dried in an oven at 70° C. and well mixed. Additional 0.1 g $MnCO_3$ was fed into the mixture with mortar grinding for 1 hour. After this, the materials were ball milled for 48 hours, pre-calcined at 450° C. for 6 hours and calcined at 900° C. for 12 hours to produce $LiNi_{0.8}Co_{0.01}Mn_{0.1}O_2$ in the form of a black powder for later use as a cathode material for Li-ion battery fabrication.

Example 3

1200 g of lime fruit and 80 g water were collected, smashed and filtered to produce a first green reagent. 1400 g of spinach and 150 g of water were collected, blended and filtered to produce a second green reagent.

The depleted battery was a Panasonic™ 18650 lithium-ion battery having $LiNi_{0.8}Co_{0.01}Mn_{0.1}O_2$ as an active material of the cathode. 5 g of the cathode material was collected, mixed, and reacted with 100 ml of the first green reagent to produce Mixture I, which was heated in a water bath at 70-80° C. for about 2 hours and then filtered to produce a metal ion solution.

250 g of the second green reagent was added to the metal ion solution to produce Mixture II, which was further evaporated and filtered to collect Precipitate I and the remaining filtrate. Precipitate I was in a form of $Ni_{0.83}Co_{0.1}Mn_{0.07}C_2O_4 \cdot 2H_2O$ and the recovering efficiencies of Ni, Co, Mn transition metals were 95.7%, 96.7% and 93.8%, respectively.

$H_3PO_4$ as a precipitating agent was added into the remaining filtrate while continuously stirring until a pH of 3 was attained. The resulting suspension was filtered to produce $Li_3PO_4$. $Li_3PO_4$ was further dissolved in a saturated $Na_2CO_3$ solution and then filtered to collect Precipitate II. Chemical analysis revealed that Precipitate II was in the form of $Li_2CO_3$ and the recovering efficiency of lithium was above 95%.

5 g of Precipitate I and 2.78 g of Precipitate II were dried in an oven at 70° C. and well mixed. Additional 0.1 g of $MnCO_3$ was fed into the mixture with mortar grinding for about 1 hour. After this, the materials were ball milled for 48 hours, pre-calcined at 450° C. for 6 hours and calcined at 800° C. for 12 hours to produce $LiNi_{0.8}Co_{0.1}Mn_{0.1}O_2$ in the form of a black powder for later use as a cathode material for Li-ion battery fabrication.

Comparative Analysis

Conventional transition metal compound recovery in industry involves the using of inorganic acids such as nitrate acid, sulfuric acid, etc. However, these acids are corrosive and detrimental to the environment. Therefore, using an organic acid to extract transition metals from a spent Li-ion battery provides an environmental benign technique to recycle these depleted batteries. Provided below is a comparison of using an organic (or "green") acid, versus an inorganic acid, for recycling a depleted Li-ion battery.

Experimental Section

In one example, citric acid (Sigma™, 99%) was used as the first green reagent, while oxalic acid (Sigma™, 99%) was used as the second green reagent. A cathode electrode was taken from a Panasonic™ 18650B lithium-ion battery, which contains $LiNi_{0.82}Co_{0.11}Mn_{0.07}O_2$ as cathode material, graphite as conductive agent and polyvinylidene fluoride (PVDF) as binder. First, 5 g of the electrode was cut into 1×1 cm pieces and put into a three-necked flask. Then 100 ml 1M citric acid aqueous solution was added into flask and heated at 80° C., stirring for about 1 hour. The suspension was further filtered to obtain the filtrate. Then, oxalic acid was added to the filtrate until the pH was at 2. The suspension was then filtered to get a blue-colored Precipitate I. Then $Na_2CO_3$ was added to the solution until the pH was at 9. The suspension was further filtered to obtain Precipitate II.

Material Characterization

The crystal structures were investigated by X-Ray Diffraction (XRD, Bruker AXS D8). The morphologies and chemical composition of materials were characterized by scanning electron microscopy (SEM, LEO FESEM 1530) equipped with energy dispersive spectroscopy (EDS). Inductively Coupled Plasma Optical Emission Spectrometry (ICP-OES) was used to analyze the element composition.

Battery Assembly

The cathode material collected, was mixed with Super P conductive agent and a polyvinylidene fluoride (PVDF) binder with a mass ratio of 8:1:1, This was further grinded in N-methyl pyrrolidone (NMP) solvent to form a slurry. The slurry was further casted on carbon-coated aluminum foil dried under 70° C. and punched into a disk-shape cathode with a diameter of 15 mm. The cathode was further assembled in a 2032 coin cell battery, using a lithium plate as anode and Celgard™ 2500 as separator, and pressed using a hydraulic machine. 40 uL of an electrolyte, which contained ethylene carbonate (EC)/diethyl carbonate (DEC) solvent with a volume ratio of 3:7 and 1 M lithium hexafluorophosphate ($LiPF_6$) salt, was used. All the fabrication steps were performed in an argon-filled glovebox. The battery was rested for 12 hours before testing.

Results/Analysis 5 g of an electrode were cut into small pieces and leached by citric acid. After filtration, the remaining solid product was 1.5 g, which means 3.5 g of cathode material was dissolved into Solution A.

Figure 7:
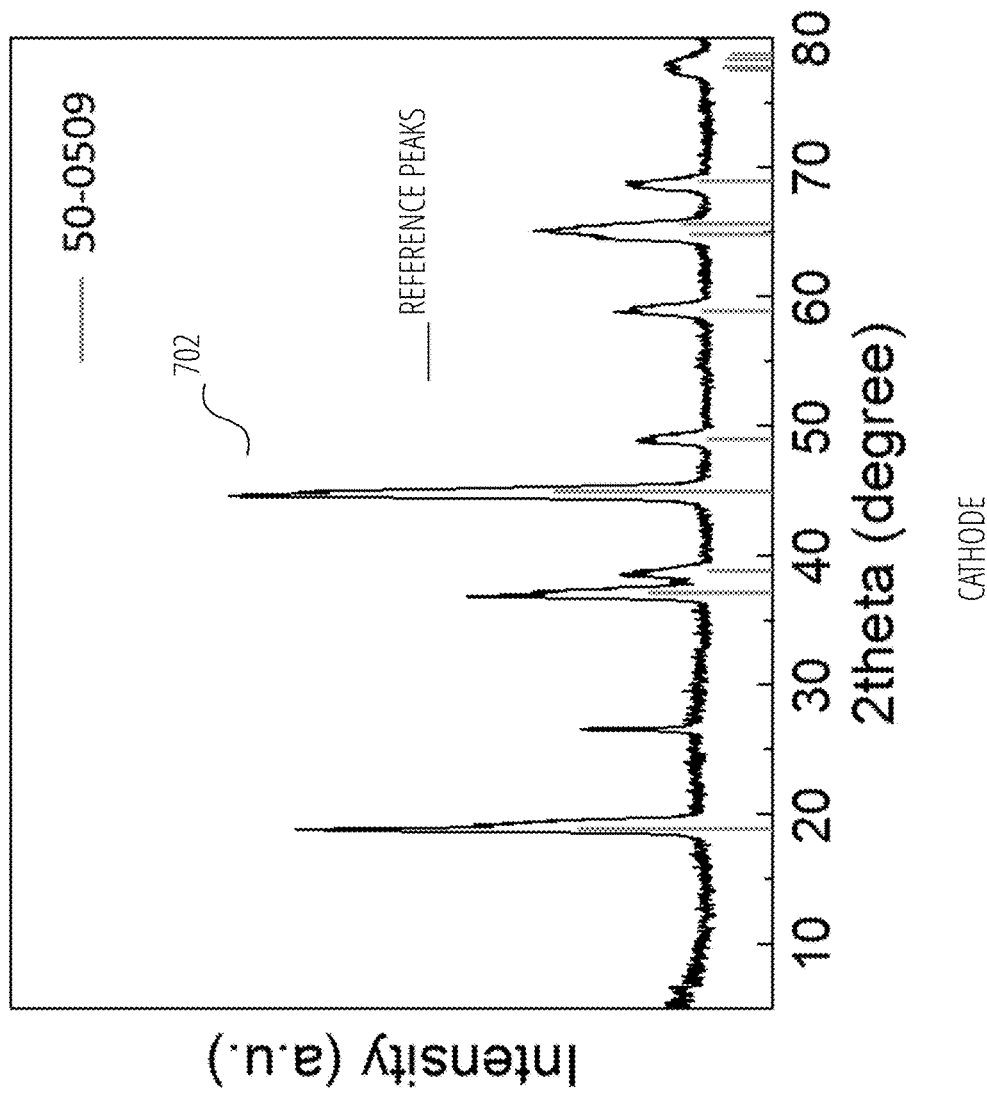
FIG. 7 illustrates an XRD pattern of a cathode in a spent lithium-ion battery in accordance with one embodiment.

FIG. 7 shows an XRD pattern 702 of a cathode taken from a spent Panasonic™ 18650B lithium-ion battery. The strong XRD peaks match well with the reference peaks, which reveals that the structure of the active cathode material is layer-structured $LiNiCoMnO_2$.

The ICP-OES analysis was further used to evaluate its chemical composition, which can be determined as $Li_{0.83}Ni_{0.82}Co_{0.11}Mn_{0.07}O_2$, as shown in Table 1.

TABLE 1

| ICP-OES result of element content in the cathode of spent lithium-ion battery. | | | | |
| --- | --- | --- | --- | --- |
| Elements | Li | Ni | Co | Mn |
| Identical spectrum/nm | 670.78 | 221.65 | 228.62 | 257.61 |
| Metal in solid sample/% | 5.28 | 41.22 | 5.39 | 3.59 |

Figure 8:
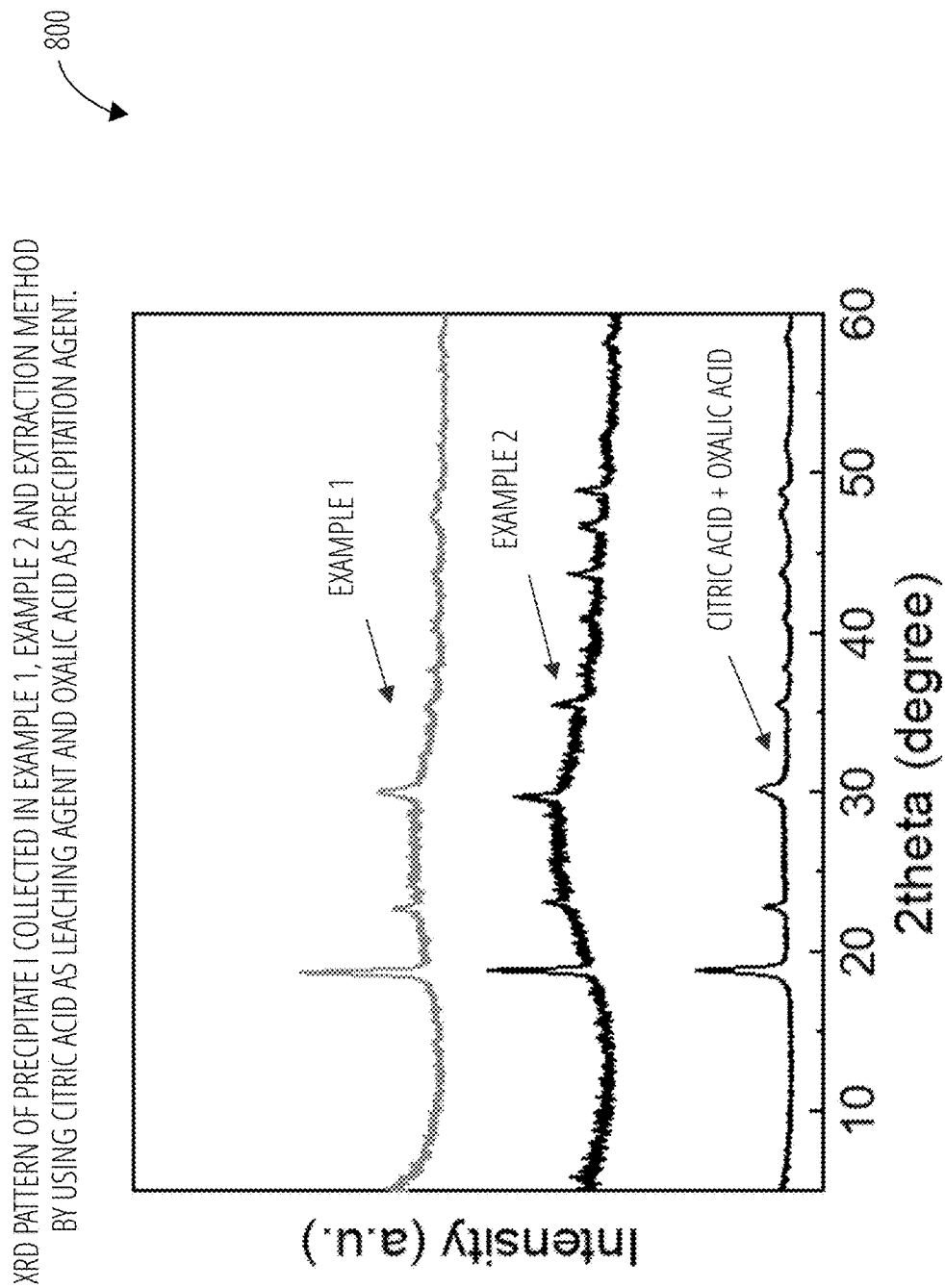
FIG. 8 illustrates an XRD pattern of Precipitate I from three examples in accordance with one embodiment.

FIG. 8 illustrates an XRD pattern 800 of precipitate I collected in Example 1, Example 2 and the extraction method of using citric acid as a leaching agent and oxalic acid as a precipitating agent.

Figure 9:
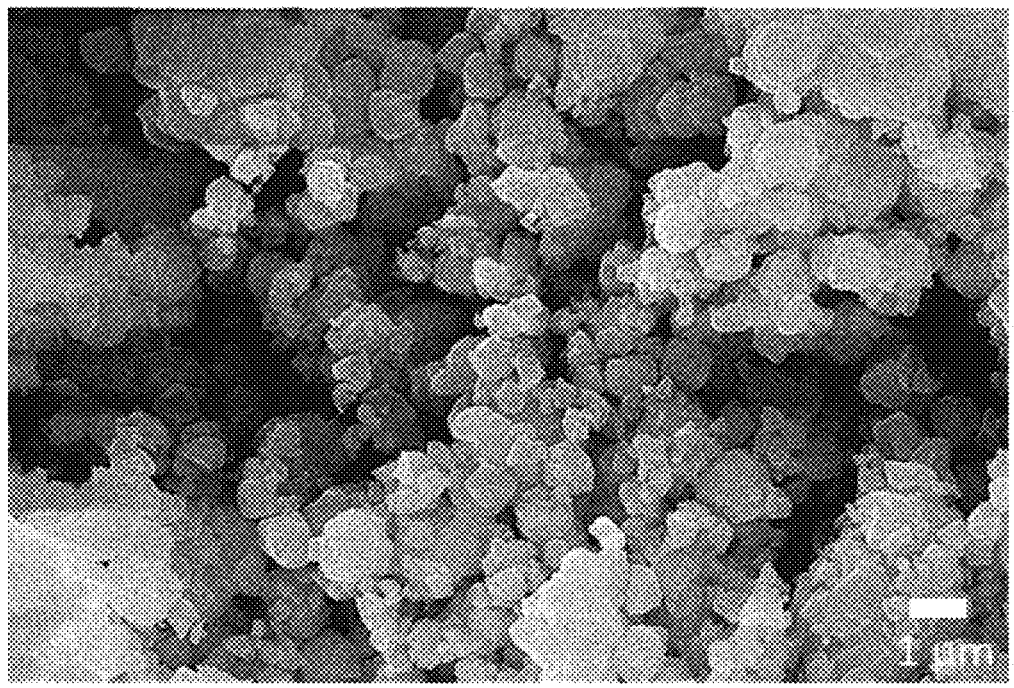
FIG. 9 illustrates a SEM image of Precipitate I in accordance with one embodiment.

FIG. 9 is a SEM image 900 of Precipitate I obtained by using citric acid as leaching agent and oxalic acid as precipitation agent. The collected precipitate indicates nano-sized particle feature with a uniform size distribution, as shown in the SEM image in FIG. 9.

Figure 10:
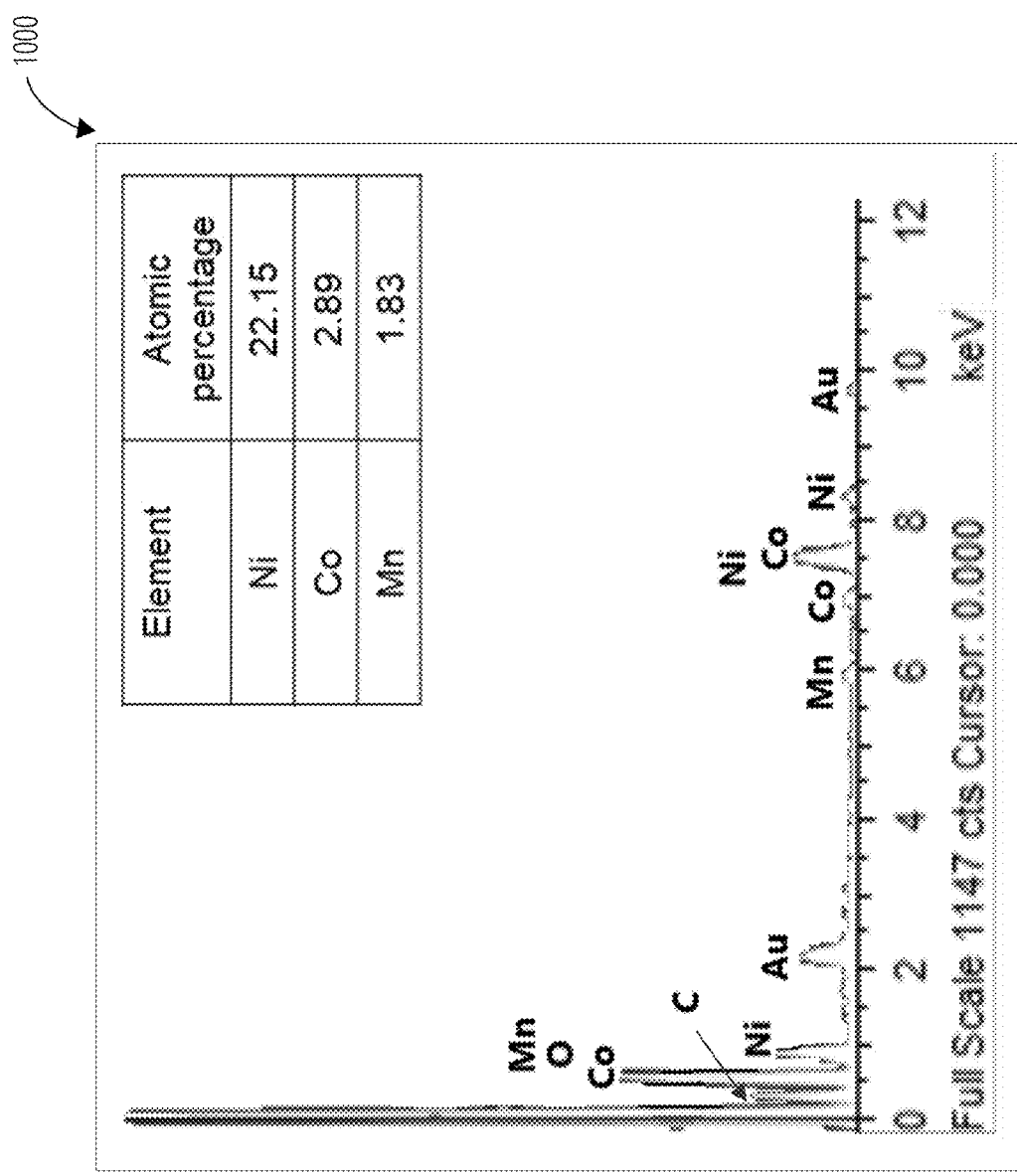
FIG. 10 illustrates a corresponding EDS analysis of precipitate I in FIG. 9.

The element ratio of Precipitate I was revealed by corresponding EDS analysis 1000 as shown in FIG. 10. The ratio of Ni:Co:Mn is 82:11:7. The chemical composition of Precipitate I was revealed by ICP-OES (Table 2), which can be determined as $Ni_{0.83}Co_{0.11}Mn_{0.07}C_2O_4$.

TABLE 2

| ICP-OES result of element content in precipitate I. | | | | |
| --- | --- | --- | --- | --- |
| Elements | Sample name | Ni | Co | Mn |
| Identical spectrum/nm | | 221.65 | 228.62 | 257.61 |
| Metal in solid sample/% | Example 1 | 20.24 | 2.53 | 1.44 |
| | Example 2 | 19.52 | 2.42 | 1.39 |
| | Citric acid + Oxalic acid | 20.84 | 2.63 | 1.47 |

Figure 11:
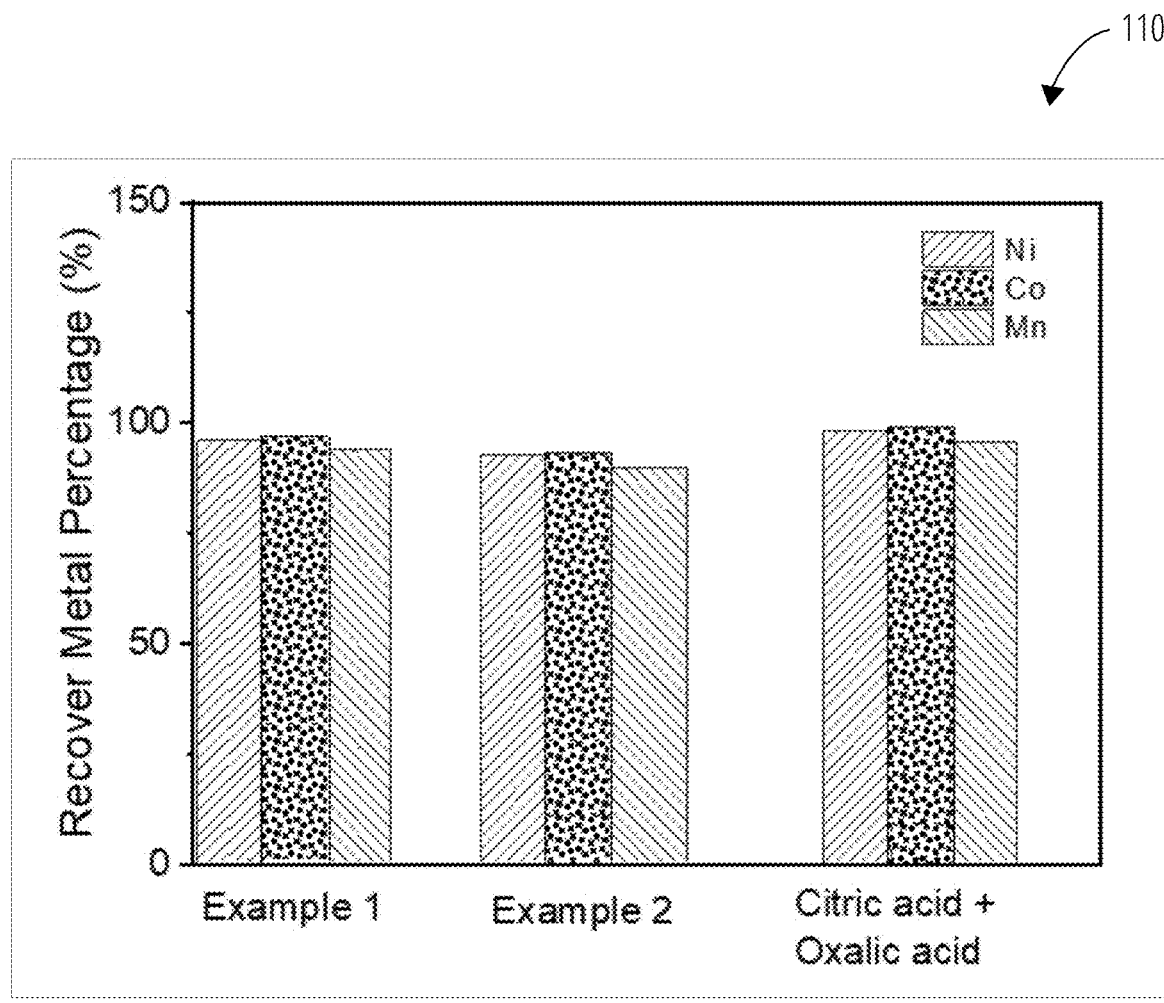
FIG. 11 illustrates a histogram of comparative results in accordance with one embodiment.

Based on the ICP-OES result, the metal recovery percentage can be calculated, as shown in the histogram 1100 of FIG. 11. Example 1 shows a high Ni, Co and Mn recovering efficiency of 95.7%, 96.7% and 93.8%, respectively. Example 2 also shows a mediate Ni, Co and Mn recovering efficiency of 92.5%, 92.8% and 89.5%, respectively. The recovering efficiency is very close to the efficiency of the example using citric acid and oxalic acid, which are 98.1%, 99% and 95.4%, respectively. These results indicate the capability of using green reagents to recover metals from the cathode of a spent lithium-ion battery.

Figure 12:
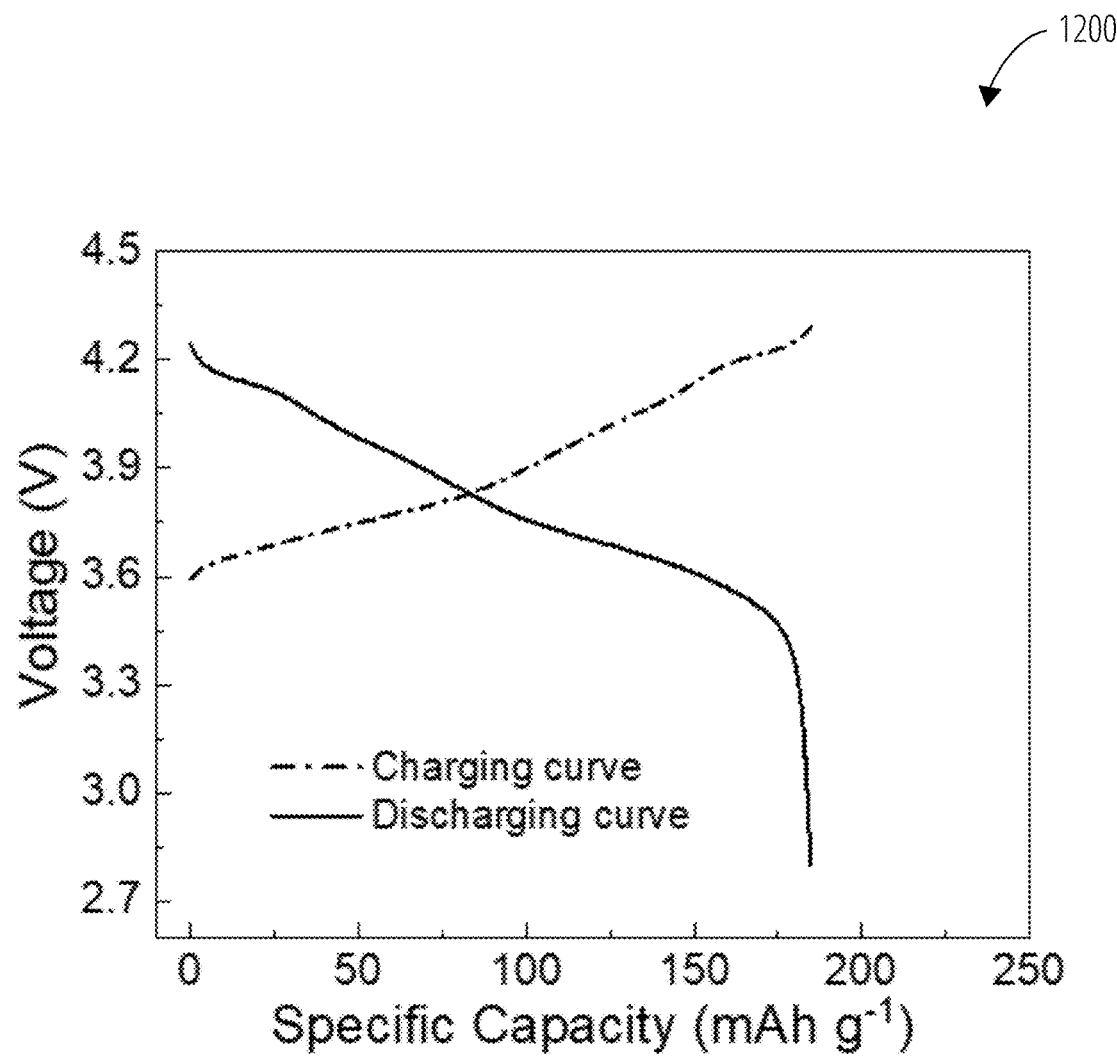
FIG. 12 illustrates galvanostatic charge-discharge profiles of synthesized cathode material from recycling of a lithium-ion battery in accordance with one embodiment.

FIG. 12 illustrates galvanostatic charge-discharge profiles 1200 of the synthesized cathode material from recycling of a lithium-ion battery.

Figure 13:
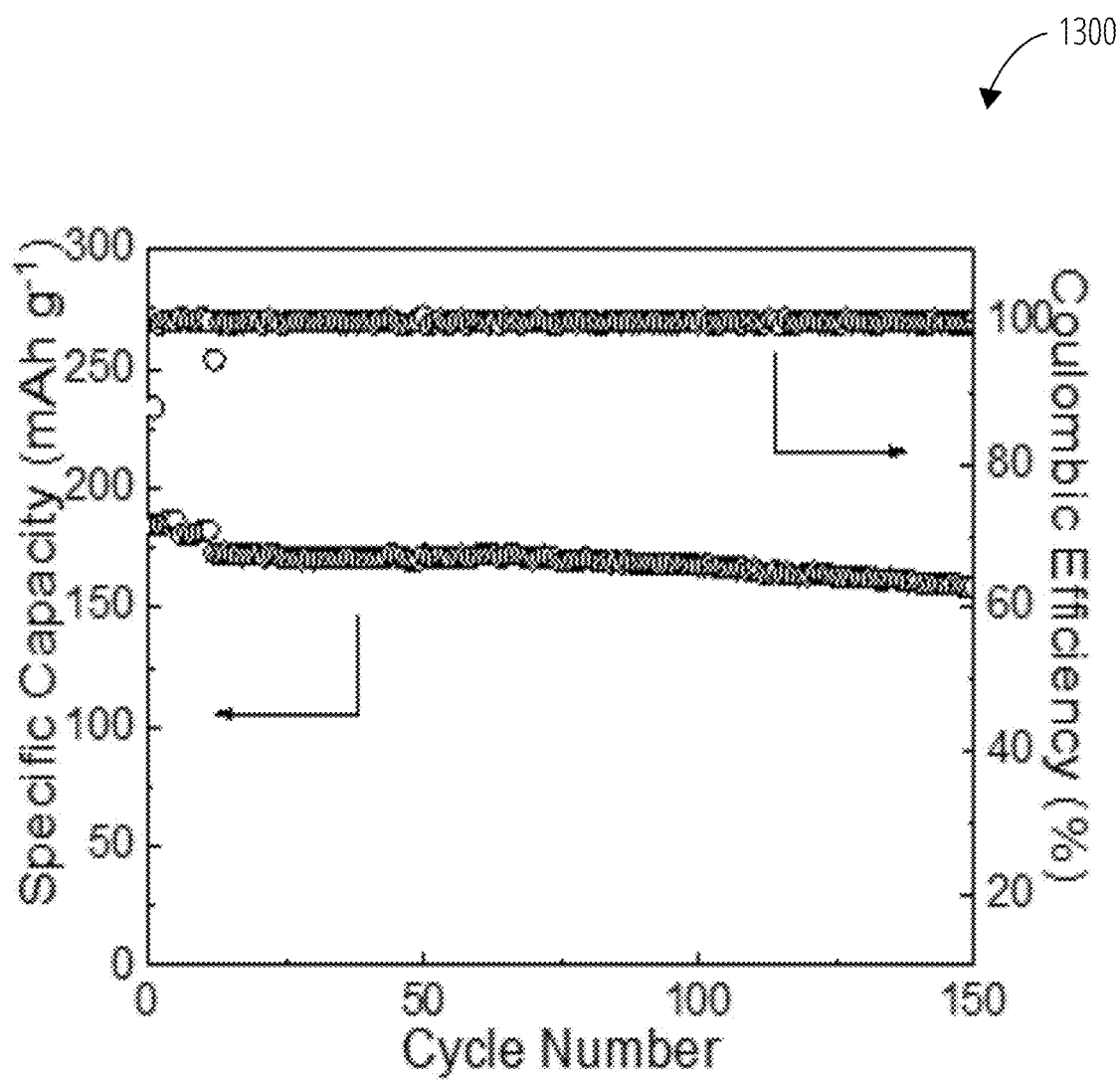
FIG. 13 illustrates the cycling performance of the synthesized cathode material shown in FIG. 12.

FIG. 13 illustrates the cycling performance 1300 of the synthesized cathode material shown in FIG. 12.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for recycling a depleted lithium-ion battery, the method comprising:
   retrieving at least one of a cathode and cathode material from the depleted lithium-ion battery;
   reacting the cathode and/or the cathode material with a first green reagent I at a steady temperature to produce a first mixture;
   filtering the first mixture to obtain a solution of ions;
   reacting the solution of ions with a second green reagent to obtain a second mixture;
   filtering the second mixture to obtain a first precipitate and a filtrate;
   precipitating the filtrate with a precipitating agent within a pH range to produce a suspension;
   filtering the suspension to obtain a second precipitate;
   combining the first precipitate and the second precipitate to provide a combination; and
   treating the combination of the first precipitate and the second precipitate to produce new cathode material, wherein the first green reagent and the second green reagent are agricultural crops.

2. The method of claim 1, wherein the first green reagent is extracted from one or more agricultural products selected from the group consisting of lemon, lime, orange, pineapple, grapefruit, blackberry, raspberry, cranberry, tamarind, grape, apple, pear and any mixture thereof.

3. The method of claim 1, wherein the first green reagent comprises:
   a first organic acid at about 0.5% to about 80% by weight of a total weight of the first reagent;
   a reducing organic matter at about 0.1% to 60% by weight of the total weight of the first reagent; and
   a solvent at about 20% to about 99.9% by weight of the total weight of the first reagent.

4. The method of claim 3, wherein the first organic acid is selected from the group consisting of citric acid, tartaric acid, maleic acid, oxalic acid, L-ascorbic acid, succinic acid, quinic acid, isocitric acid and any mixture thereof.

5. The method of claim 3, wherein the reducing organic matter is selected from the group consisting of L-ascorbic acid, glucose, fructose and any mixture thereof.

6. The method of claim 3, wherein the solvent is selected from the group consisting of water, an alcohol and any mixture thereof.

7. The method of claim 1, wherein the second green reagent is extracted from one or more agricultural products selected from the group consisting of spinach, cocoa, beans, lettuce, kale, bamboo, celery, beet, amaranth, apple, leeks, coffee bean, hawthorn, grapes, plant leaves, tea leaf, purslane, bitter herbs, bamboo shoots, bitter gourd and any mixture thereof.

8. The method of claim 1, wherein the second green reagent comprises:
   a second organic acid at about 0.1% to about 60% by a total weight of the second reagent; and
   a solvent at about 40% to about 99.9% by the total weight of the second reagent.

9. The method of claim 8, wherein the second organic acid is selected from the group consisting of oxalic acid, tannic acid, caffeic acid and any mixture thereof.

10. The method of claim 8, wherein the solvent is selected from the group consisting of water, an alcohol and any mixture thereof.

11. The method of claim 1, wherein the steady temperature is between about 30° C. and about 90° C.

12. The method of claim 1, wherein the pH range is from about 1 to about 12.

13. The method of claim 1, wherein the precipitating agent is selected from sodium chloride (NaCl), sodium bisulfate ($NaHSO_4$), monosodium phosphate ($NaH_2PO_4$), sodium hydroxide (NaOH), sodium carbonate ($Na_2CO_3$), sodium bicarbonate ($NaHCO_3$), trisodium phosphate ($Na_3PO_4$), sodium sulfite ($Na_2SO_3$), disodium phosphate ($Na_2HPO_4$) and any mixture thereof.

14. The method of claim 1, wherein the first precipitate is a transition metal compound comprising at least one of a nickel ion, a cobalt ion and a manganese ion.

15. The method of claim 1, wherein the second precipitate comprises a lithium salt.

16. The method of claim 1, wherein treating the combination comprises proportional feeding, grinding and sintering.

* * * * *